(12) United States Patent
Krauch et al.

(10) Patent No.: US 9,996,656 B2
(45) Date of Patent: Jun. 12, 2018

(54) DETECTING DISPENSABLE INVERTER CHAINS IN A CIRCUIT DESIGN

(71) Applicant: INTERNATIONAL BUSINESS MACHINES CORPORATION, Armonk, NY (US)

(72) Inventors: Ulrich Krauch, Dettenhausen (DE); Kurt Lind, Tuebingen (DE); Friedrich Schroeder, Stuttgart (DE); Stefan Zimmermann, Stuttgart (DE)

(73) Assignee: International Business Machines Corporation, Armonk, NY (US)

(*) Notice: Subject to any disclaimer, the term of this patent is extended or adjusted under 35 U.S.C. 154(b) by 0 days. days.

(21) Appl. No.: 15/193,456

(22) Filed: Jun. 27, 2016

(65) Prior Publication Data

US 2017/0371998 A1 Dec. 28, 2017

(51) Int. Cl.
*G06F 17/50* (2006.01)

(52) U.S. Cl.
CPC ...... *G06F 17/5081* (2013.01); *G06F 2217/84* (2013.01)

(58) Field of Classification Search
CPC ...... G01R 31/31704; G01R 31/318314; G01R 31/318583; G01R 31/3177; G06F 17/5022; G06F 17/5027; G06F 17/5045; G06F 17/505; G06F 2217/14; G06F 3/0383; G06F 3/04897; G06F 12/0811; G06F 12/00;

(Continued)

(56) References Cited

U.S. PATENT DOCUMENTS 7,823,108 B2 10/2010 Curtin et al.
8,522,182 B2 8/2013 Krauch et al.
(Continued)

FOREIGN PATENT DOCUMENTS

CN 101727519 B 10/2009

OTHER PUBLICATIONS

Zarkesh-Ha et al., "Logic Gate Failure Characterization for Nanoelectronic EDA Tools", IEEE Computer Society, 25th International Symposium on Defect and Fault Tolerance in VLSI Systems, Oct. 6-8, 2010 (pp. 16-23).

(Continued)

*Primary Examiner* — Binh Tat
(74) *Attorney, Agent, or Firm* — Margaret A. McNamara, Esq.; Kevin P. Radigan, Esq.; Heslin, Rothenberg, Farley & Mesiti, P.C.

(57) ABSTRACT

Automated analyzing of an endpoint report for a design of an electronic circuit is provided, which includes: identifying, by a processing device, that one or more test points of a selected path of the endpoint report are associated with one or more inverter devices of an inverter chain of the design of the electronic circuit; establishing, by the processing device, a chain criticality value for the inverter chain; and determining, by the processing device, whether to identify the inverter chain as a dispensable inverter chain, the determining using, at least in part, the chain criticality value for the inverter chain. The establishing may include updating the chain criticality value for each inverter device of the inverter chain, where the chain criticality value is a summed value obtained from criticality values for the one or more inverter devices of the inverter chain.

20 Claims, 13 Drawing Sheets

(58) Field of Classification Search
CPC ............. G06F 17/5031; G06F 12/0831; G06F 12/0862; G06F 12/0864; G06F 12/1027; G06F 13/287; G06F 15/17381; G06F 15/17387; G06F 15/76; G06F 15/8069; G06F 2212/1016; H05B 37/0281
USPC .................................................. 716/110–118
See application file for complete search history.

(56) References Cited

U.S. PATENT DOCUMENTS

| | | | |
|---|---|---|---|
| 8,560,988 B2 | 10/2013 | Sarwary | |
| 8,650,518 B2 | 2/2014 | Boehm | |
| 8,788,995 B1 | 7/2014 | Kumar et al. | |
| 8,863,052 B1 | 10/2014 | Dhuria et al. | |
| 2003/0023941 A1* | 1/2003 | Wang | G01R 31/31704 716/103 |
| 2005/0268258 A1 | 12/2005 | Decker | |
| 2005/0289486 A1* | 12/2005 | Caron | G06F 17/504 716/107 |
| 2006/0080627 A1 | 4/2006 | Murgai et al. | |
| 2006/0101363 A1 | 5/2006 | Fry et al. | |
| 2006/0218515 A1 | 9/2006 | Byrn et al. | |
| 2006/0242502 A1* | 10/2006 | Wang | G01R 31/31926 714/724 |
| 2007/0226667 A1 | 9/2007 | Chadwick et al. | |
| 2008/0195941 A1 | 8/2008 | Shibuya et al. | |
| 2015/0324513 A1 | 11/2015 | Teig et al. | |

OTHER PUBLICATIONS

Xu, Yang, "Algorithms for Automatic Generation of Relative Timing Constraints", Department of Electrical and Computer Engineering, The University of Utah, May 2011 (pp. 1-131).

IIBM, "zArchitecture Principles of Operation", IBM Publication No. SA22-7832-10, Mar. 2015.

IBM, "Power ISA", Version 2.07B, International Business Machines Corporation, Apr. 9, 2015.

Haller et al., "Detecting Circuit Design Flaws Based on Timing Analysis", U.S. Appl. No. 14/858,040, filed Sep. 18, 2015 (47 pages).

Krauch et al., "List of IBM Patent Applications Treated as Related", U.S. Appl. No. 15/193,456, filed Jun. 27, 2016, dated Jun. 28, 2016 (2 pages).

Haller, et al., Non-Final Office Action for U.S. Appl. No. 14/858,040, filed Sep. 18, 2015, dated May 11, 2017 (9 pages).

Haller, et al., Final Office Action for U.S. Appl. No. 14/858,040, filed Sep. 18, 2015, (U.S. Patent Publication No. 2017/0083658 A1), dated Oct. 19, 2017 (6 pages).

* cited by examiner

| | | | | | | | | |
|---|---|---|---|---|---|---|---|---|
| ---> | nclk: | F M- | 0.00 | 0.00w | | | 9999 PI | nclk |
| ---> | xxxxxx_yyyyyy_zzzzz_8d_xbox0_0/nclk' | F M- | 0.09 | 99.94 | -99.74 | 99.00 | 0.00 | 1 cw_lcbes_ | f LCB | nclk_101_c1 |
| ---> | xxxxxx_yyyyyy_zzzzz_8d_xbox0_0/clk | R M+ | 1.03 | 0.00 | -0.88 | 99.02 | 0.00 | 0 cw_lcbes_ | f LCB |
| ---> | xxxxxx_yyyyyy_zzzzz_8d_xbox0_0/clk_e | R M+ | 2.03 | 99.55 | -0.88 | 99.34 | 0.00 | 0 cw_lcbes_ | f LCB |
| ---> {a} | xxxxxx_yyyyyy_zzzzz_8d_xbox0_0/l1cl | R M+ | 3.58 | 9.01w | -0.88 | 99.37 | 0.00 | 99 cw_lcbes_ | f LCB | xxxxyyyzzzlat_l1clk_dom_8d_1 |
| N---> | xxxxxx_yyyyyy_zzzzz_rq_esc_62/l1clk | R M+ | 4.59 | 99.97 | -0.88 | 99.51 | 99.66 | 99 cw_inv_lat_1h18t | 990 SRL | xxxxyyyzzzlat_l1clk_dom_8d_1 |
| ---> {b} | xxxxxx_yyyyyy_zzzzz_esc_62/q_b | F M@L | 5.56 | 9.33w | -0.88 | 99.96 | 99.66 | 99 cw_inv_lat_1h18t | 990 SRL | xxxxyyyzzz_result_rq_q(62) |
| ---> | xxxxxx_yyyyyy_zzzzz_rq_q_1i(62)/a | F M@L | 6.89 | 9.05 | -0.88 | 99.59 | 99.15 | 1 cw_invert_e_hn | 9c NOT | xxxxyyyzzz_result_rq_q(62) |
| ---> | xxxxxx_yyyyyy_zzzzz_rq_q_1i(62)/yR | M@L | 7.94 | 9.87w | -0.88 | 99.68 | 99.15 | 1 cw_invert_e_hn | 9c NOT | xyz_result(62) |
| ---> | xxxxxx_yyyyyy_zzzzz_result_1i(62)/a | R M@L | 8.81 | 9.80 | -0.88 | 99.33 | 99.49 | 1 cw_invert_e_hn | 9c NOT | xyz_result(62) |
| ---> | xxxxxx_yyyyyy_zzzzz_result_1i(62)/y | F M@L | 9.62 | 9.56w | -0.88 | 99.46 | 99.49 | 1 cw_invert_e_hn | 9c NOT | xyz_result_1i(62) |
| ---> | xxxxxx_yyyyyy_zzzzz_result_2(62)/a | F M@L | 10.17 | 9.23 | -0.88 | 99.65 | 99.78 | 2 cw_invert_e_hn | 9c NOT | xyz_result_1i(62) |
| ---> | xxxxxx_yyyyyy_zzzzz_result_2(62)/y | R M@L | 11.40 | 9.33w | -0.88 | 99.40 | 99.78 | 2 cw_invert_e_hn | 9c NOT | xyz_result_2(62) |
| ---> | xxxxxx_yyyyyy_zzzzz_result_3i(62)/a | R M@L | 12.73 | 9.04 | -0.88 | 99.09 | 99.07 | 1 cw_invert_e_hn | 9c NOT | xyz_result_2(62) |
| ---> | xxxxxx_yyyyyy_zzzzz_result_3i(62)/y | F M@L | 13.78 | 9.20w | -0.88 | 99.16 | 99.07 | 1 cw_invert_e_hn | 9c NOT | xyz_result_3i(62) |
| ---> | xxxxxx_yyyyyy_zzzzz_result_4(62)/a | F M@L | 14.97 | 9.43 | -0.88 | 99.76 | 99.82 | 2 cw_invert_e_hn | 9c NOT | xyz_result_3i(62) |
| ---> | xxxxxx_yyyyyy_zzzzz_result_4(62)/y | R M@L | 15.41 | 9.03w | -0.88 | 99.23 | 99.74 | 2 cw_invert_e_hn | 9c NOT | xyz_result_4(62) |
| ---> | xxxxxx_yyyyyy_zzzzz_result_3i(62)/a | R M@L | 16.43 | 9.59 | -0.88 | 99.13 | 99.74 | 2 cw_invert_e_hn | 9c NOT | xyz_result_4(62) 0.13 adjust |
| ---> | xxxxxx_yyyyyy_zzzzz_result_3i(62)/y | F M@L | 17.15 | 9.85w | -0.88 | 99.08 | 99.26 | 1 cw_invert_e_hn | 9c NOT | xyz_result_4i(62) 1.07 adjust |
| ---> | xxxxxx_yyyyyy_zzzzz_result_5(62)/a | F M@L | 18.07 | 9.21 | -0.88 | 99.27 | 99.26 | 1 cw_invert_e_hn | 9c NOT | xyz_result_4i(62) 0.22 adjust |
| ---> | xxxxxx_yyyyyy_zzzzz_result_5(62)/y | R M@L | 19.50 | 9.68w | -0.88 | 99.19 | 99.69 | 3 cw_invert_e_hn | 9c NOT | xyz_result_18(62) 0.51 adjust |
| ---> | xxxxxx_yyyyyy_zzzzz_result_21i(62)/a | R M@L | 20.69 | 9.21 | -0.88 | 99.36 | 99.69 | 3 cw_invert_e_hn | 9c NOT | xyz_result_18(62) 0.29 adjust |
| ---> | xxxxxx_yyyyyy_zzzzz_result_21i(62)/y | F M@L | 21.19 | 9.50w | -0.88 | 99.26 | 99.05 | 1 cw_invert_e_hn | 9c NOT | xyz_result_21i_n36259(62) 0.75 adjust |
| ---> | xxxxxx_yyyyyy_zzzzz_result_22(62)/a | F M@L | 22.44 | 9.69 | -0.88 | 99.33 | 99.05 | 9.58 | 1 cw_invert_e_hn | 9c NOT | xyz_result_21i_n36259(62) |
| ---> | xxxxxx_yyyyyy_zzzzz_result_22(62)/y | R M@L | 23.14 | 9.70w | -0.88 | 99.59 | 99.92 | 9.85 | 3 cw_invert_e_hn | 9c NOT | xyz_result_22_n36260(62) 0.22 adjust |

Analysis report:

E (Device delay): Inverter xeve_ec_l_xxx_f9_fw_hi_4q_q_n235391_2(0)/a delay is xx.00 ps. Its output slew is x7.0.

E (Device delay): AOI22 xxxx_opb_rd_mux4_xxx_hi_i35_14_0/a2 delay is x.00 ps. Its output slew is x3.0.

E (Wire delay): Wire delay of net 'xxx.yyy.zz_opb8t_2(62)' is xx.04ps. The load is x2.3fF and the sink slew is x5.08ps.

E (Inverter chain): Chain of 2 inverters from pin 'xtdc_xxx_opb_1i(62)/a' to pin 'xtdc_buf_xx_opb_2(62)/y' with fan out 1:1:1 and total wire delay of x .Ops detected. Please consider moving the macro pin or latch.

W (Integration delay): The relative integration delay is xx.70%.

W (Device delay): XXLAT xxx_opb_vfx_f9_fw_hi_4q_esc_O/l1clk delay is x8.00 ps. Its output slew is x4.0. Note that its fan out is 3

W (Wire delay): Wire delay of net 'xxx_opb_vfx_f9_fw_hi, 4 q _q .n 235391_2 (0)' is x.0ps. The load is x6. Off and the sink slew is xx.0ps.

W (Device delay): NAND3 xxx_opb_rd_mux4_xxx_hi_i0_14_0/b delay is xx.00 ps.

W (Device delay): Inverter xxx_opb_rd_mux4_xxx_hi_i47_14_0/a delay is xx.00 ps.

W (Device delay): Inverter xxx_opb_rd_mux4_xxx_hi_i51_14_0/a delay is xx.00 ps. Its output slew is x1.0.

W (Wire delay): Wire delay of net 'xx_opb(62) is x.0ps. The load is xx.0fF and the sink slew is xx.0ps.

W (Inverter chain): Chain of 2 inverters from pin 'xxxwb_opb.rd_mux4_xxx_hi_i47_14_0/a' to pin 'xxxwb_opb_rd_mux4_xxx.hi_i5L14_0/y' with fan out 1:1:1 and total wire delay of xx.0ps detected. Please consider moving the macro pin or latch.

W (Slew): The slew of xx.08ps at pin 'xxx.yybuf_r60_xxx_opb8t_2_i662/din' is close to the slew limit of x5.0

W (Slew): The slew of xx.00ps at pin 'xxx_opb(62)' is close to the slew limit of xx.0

W (Slew): The slew of xx.00ps at pin 'xxx_opb(62)' is close to the slew limit of xx.0

W (Wire delay): Wire delay of net 'xxx_opb_2(62)' is x.0ps. The load isxx.0fF and the sink slew is xx.0ps.

W (Device delay): AOI22 xremaptdecomp_20939_net36721 If al delay is xx.00 ps.

W (Wire delay): Wire delay of net 'xxx_xshi_zmac_xxx_opb3263_mux_out(30)' is xxx.0ps. The load is xx.0fF and the sink slew is xx.0ps.

W (Wire delay): Wire delay of net 'xxx_xshi_zmac_fO_opb_cgfO_s_n146966(62)' is 3.0ps. The load is xx.0fF and the sink slew is xx.0ps.

DETECTING DISPENSABLE INVERTER CHAINS IN A CIRCUIT DESIGN

BACKGROUND

One or more aspects of the invention relate generally to analyzing design problems of electronic chips, and in particular, to analyzing a timing endpoint report for a design of an electronic circuit.

Advancing semiconductor manufacturing technology allows squeezing more and more functionality, and thus, transistors on a single semiconductor chip. By increasing the complexity within a chip design, dependencies between different functional points, size and placement of individual devices, as well as physical/geometrical paths between logically dependent functions also increase. Additionally, the operational speed is ever increasing using higher and higher clock rates. Timing issues arise even when using synthesis tools for selected functions because these synthesis tools may not be perfect. That is, several timing problems remain in synthesized circuits. Thus, a manual analysis and repair of the circuit design may be required. One solution to address this problem is a usage of endpoint reports as a result of an automatic analysis of a designed circuit. Such endpoint reports look for critical signal paths in the design but which do not directly reveal what circuit design flaws need to be improved. In order to find these circuit design flaws in an endpoint report, a series of manual steps are currently required to be performed by a system designer. The system designer needs to bring in his/her experience and time to find the circuit design flaws.

SUMMARY

In one aspect, a computer-implemented method of analyzing an endpoint report for a design of an electronic circuit is provided. The computer-implemented method includes: ascertaining, by a processing device, that one or more test points of a selected path of the endpoint report are associated with one or more inverter devices of an inverter chain of the design of the electronic circuit; establishing, by the processing device, a chain criticality value for the inverter chain; and determining, by the processing device, whether to identify the inverter chain as a dispensable inverter chain, the determining using, at least in part, the chain criticality value for the inverter chain.

As a further aspect, a computer system for analyzing an endpoint report for a design of an electronic circuit is provided. The computer system includes a memory; and a processing device in communication with the memory, wherein the computer system performs a method which includes: ascertaining, by a processing device, that one or more test points of a selected path of the endpoint report are associated with one or more inverter devices of an inverter chain of the design of the electronic circuit; establishing, by the processing device, a chain criticality value for the inverter chain; and determining, by the processing device, whether to identify the inverter chain as a dispensable inverter chain, the determining using, at least in part, the chain criticality value for the inverter chain.

In yet another aspect, a computer program product for analyzing an endpoint report for a design of an electronic circuit is provided. The computer program product includes a computer readable storage medium readable by a processing circuit and storing instructions for execution by the processing circuit for performing a method, which includes: ascertaining, by a processing device, that one or more test points of a selected path of the endpoint report are associated with one or more inverter devices of an inverter chain of the design of the electronic circuit; establishing, by the processing device, a chain criticality value for the inverter chain; and determining, by the processing device, whether to identify the inverter chain as a dispensable inverter chain, the determining using, at least in part, the chain criticality value for the inverter chain.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 illustrates a typical endpoint report to be analyzed, in accordance with one or more aspects of the present invention;

FIG. 8 shows a sample endpoint report, with one or more dispensable inverter chains highlighted, in accordance with one or more aspects of the present invention;

FIG. 9 depicts one example of a text-based endpoint report analysis result, with multiple potentially dispensable inverter chains highlighted with a warning flag or an error flag, and with a suggested change to the circuit design noted, which will allow removal of the flagged, dispensable inverter chain, in accordance with one or more aspects of the present invention;

DETAILED DESCRIPTION

Figure 1:
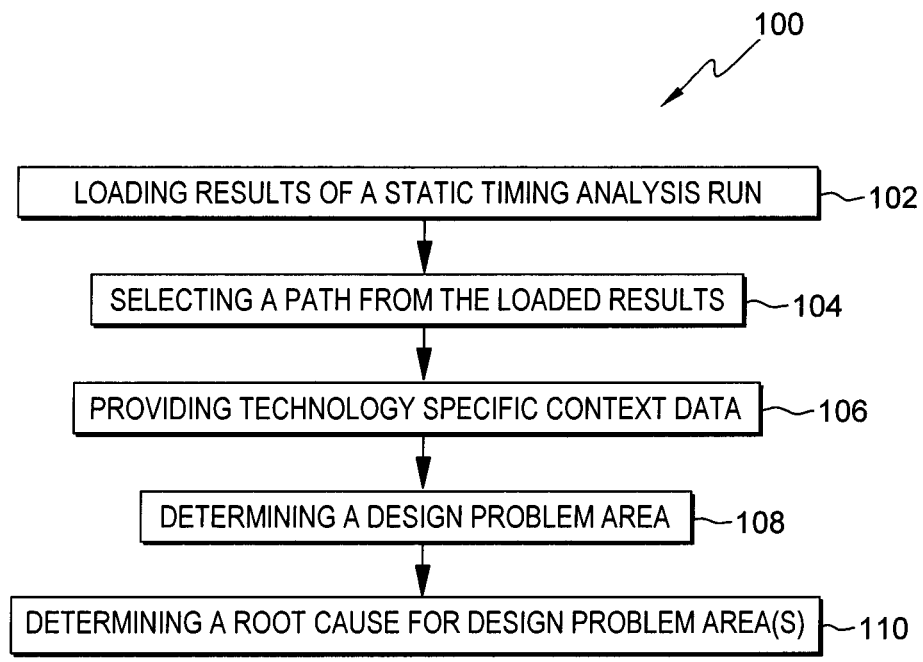
FIG. 1 shows an embodiment of a method of analyzing an endpoint report for a design of an electronic circuit, in accordance with one or more aspects of the present invention.

In the context of this description, the following conventions, terms and/or expressions may be used:

The term circuit design flaw may denote deficiencies in a design of an electronic chip. The electronic circuit of the chip may be unstable, not fast enough or may produce inconsistent output signals. In general, an optimization of devices, connection and signal flows may be achieved by a detailed analysis of the circuit design and chip design to overcome circuit design flaws.

The term electronic circuit may denote an integrated semiconductor circuit of electronic and electric components commonly referred to as an electronic chip. Such a chip may be manufactured using different technology processes like a bipolar process or a CMOS process with different numbers of steps relating to different layers of the semiconductor chip. Individual devices of the electronic circuit may be linked to each other via on-chip wires. The electronic circuits may also be designed as three-dimensional chips being connected to each other through vias. Many millions of different devices may be integrated into a semiconductor-based electronic circuit.

The term endpoint report may denote a list of timing critical paths through the circuit, each one being a path between an input and an output with the maximum delay. The endpoint report may be one of the results of a static timing analysis.

An endpoint report may be a list of textual tables of different simulation calculations comprising a lot of difficult to interpret abbreviations and acronyms. A possible example of an endpoint report path is shown as FIG. 2. This may be hard to read and interpret. Typical values given are data values for clock phase, arrival time, total capacity, sink capacity, drain capacity, gate capacity, fan out, or delay.

The term static timing analysis run may denote a simulation method to compute the expected timing of a digital circuit without requiring a full simulation of the circuit. Static timing analysis may provide a fast and reasonably accurate measurement of circuit timing. It may provide a list of timing critical paths through the circuit.

The term path may denote a route through an electronic circuit. Electric signals may travel along such a path. The signals may be delayed by individual devices—including wires between the devices—when traveling along such a path. The delays may, e.g., be characteristic values of the related devices and or wire laying or characteristics. A path may be denoted as "critical" if the signals progressing along such a critical path determine a general chip behavior, e.g., the overall processing speed of the chip.

The term technology specific context data may denote characteristic values for specific device type manufacturers using a specific manufacturing technology. Typical devices using one manufacturing technology may cause different signal delays if compared to equivalent devices manufactured using another manufacturing technology, i.e., another production process.

The term test point may denote an element regarding a row in a critical path computed by static timing analysis.

Each test point may correspond to a device pin in an electronic circuit, which may be traversed by the critical path. Each test point may describe specific parameters for this device pin, like its name, connected net name, arrival time, slew, capacitances, delays, etc. The relevant parameters in the context of this document are called 'design quality parameters' throughout this document.

The term design quality parameters may denote different numeric values designed to differentiate a good design compared to a bad design of an electronic chip layout. A good design may, e.g., cause only little delays in comparison to high delays in bad designs or chip layouts. The same may apply to signal slews and/or placements of devices or wirings as part of the electronic chip. It may be understood that a placement relates to a geometric position within the chip layout.

The term design problem area may denote a group of devices, test points and/or wirings causing, e.g., signal delays or, other physical effects influencing the functionality of an electronic chip in a negative way. A design problem area may relate to only one device or even one single feature of a device or the way different devices are linked to each other and/or interact with each other. A design problem area may typically be related to a test point. However, also more than one design problem area may relate to one test point. Additionally, a design problem area may also relate to different test points.

The term root cause may denote a fundamental ground for a design problem area. The real cause may also be understood as a relative "problem importance". By identifying a root cause—or identifying a problem importance—for a given design problem area, the functional design problem may be addressed by a different design of the electronic chip. Thus, the design problem area may be eliminated resulting in high-quality electronic chips.

The term design problem area data may denote data and/or measurement values relating to a design problem area. This may enable a comparison of different design problem areas. The data may also be used for a further analysis process to optimize the chip design.

The term phase may denote a timing phase corresponding to a clocking scheme applied when computing the static timing analysis. Some circuits may support multiple clocking schemes, like, e.g., scannable latches that both support a normal data clocking but also a scan clocking for circuit initialization and debugging. When performing static timing analysis for a circuit that supports multiple clocking schemes, simulation may have to be performed for each clocking scheme separately and the clocking scheme may be denoted as phase in the endpoint report.

The term placement may denote a geometrical position of a device or any other component of the electronic circuit of the chip relative to an edge or corner of the chip. Based on such placement data, distances in an x- and/or y-direction between different devices may be calculated.

The term adjust may denote a timing adjustment performed during static timing analysis due to external conditions like noise and capacitive coupling between different nets. The additional delay introduced by this coupling may be added as an adjust test point to the critical path.

The term assertion may denote the contract applied to the primary input and output pins of a circuit during static timing analysis. It may mainly comprise an asserted arrival time and slew for input pins, and the required arrival time and capacitive load for output pins.

The methods, systems, and computer program products disclosed herein for analyzing an endpoint report for a design of an electronic circuit offer a number of advantages.

Although endpoint reports of a circuit design analysis are available, they are typically delivered in a list form which is not easy to interpret, requires a lot of experience of the circuit designer to interpret, and requires time for the circuit designer to identify circuit design flaws and determine how to address them, such as how to repair.

One or more aspects of the methods, systems, and computer program products described herein improve the tool support for identifying circuit design flaws, and in addition to giving recommendations of how to improve the circuit design in order to meet predefined design criteria. Thus, average circuit designers, not having many years of experience in enhancing existing circuit designs by addressing timing issues on critical paths, may be able to improve circuit designs by using the recommendations generated by one or more of the aspects provided herein.

One or more aspects may use most of the available information about the actual design as well as technology specific context data that is generally available and put into context of a specific circuit design. For each test point, a series of analysis is performed automatically based on known parameters of implemented devices, placement of devices as part of the physical layout of the circuit in comparison to a critical path, as well as specific device pins, wire delays, adjusts, device delays (like inverter, NAND, NOR, or buffer), assertions, slews, just to name a few. For this, known device and placement data may be used, and expected delays, etc. may be tested against typical threshold values (warning and/or error threshold values).

Thus, a complete behavior of devices and wires as part of critical paths may be analyzed automatically. Design problem areas may be identified and may be highlighted in a graphically enhanced way and recommendations may be given to the circuit designer to improve chip design work. This may improve the speed in which circuit design flaws (such as dispensable inverter chains) may be detected and addressed. Thus, the design process may be shorter and the quality and functionality of the designed circuit may be improved.

An example may demonstrate achieved effects: an inverter has a typical delay of 4 to 6 ps (pico seconds) when properly used. If the delay of the inverter is comparably high, this may be caused by:
- an inverter input pin slew that is too high; in this case, a better wiring in front of the inverter may be recommended;
- the inverter transistors have a high threshold voltage; in this case, using faster transistors may be recommended;
- the inverter may have a too high of a capacity to load on its output; if the inverter output fan is too high, it may be recommended cloning the inverter (or other components in front of it) and that may distribute the fan out in the resulting circuit—if the load is too high but the fan out is low, it may be recommended using a better wire quality after the inverter or reduce the wire length.

This way, the designer automatically obtains a set of recommendations to improve the circuit without personally intensively analyzing details of an available endpoint path. The findings and resulting recommendations may be displayed in an augmented representation as part of an enhanced endpoint path report and/or in addition in the form of textually expressed recommendations (as explained further below with reference to FIGS. 8 & 9).

FIG. 1 shows an embodiment 100 of a method for analyzing an endpoint report for a design of an electronic circuit, in accordance with one or more aspects of the present invention. In the depicted embodiment, method 100 includes loading results of a static timing analysis run 102; selecting a path from the loaded results 104; and providing technology specific context data 106. Additionally, the method includes determining for one or more (e.g., every) test point of the selected path, design quality parameters for determining a design problem area 108; and determining for one or more (e.g., every) design problem area, a root cause by analyzing the design problem area, including associated data in comparison to related ones of the technology specific context data 110. It may be noted that the mentioned root cause may also be interpreted as a problem severance in the endpoint report.

According to one or more embodiments of the method, the technology specific context data may comprise at least one out of the group comprising a threshold value—e.g., a misplacement of error distance threshold value, a critical wire delay threshold, a device output slew, etc.—a typical delay value or, a maximum slew value for each phase. Technology specific context data may thus relate to a context of the used underlying manufacturing or production technology process of the electronic circuit. This may, e.g., relate to the semiconductor material used, manufacturing process boundaries of the resulting electronic chip or other environmental parameters in the context of the semiconductor circuit manufacturing process.

According to one or more embodiments of the method, the design quality parameter may comprise at least one out of the group comprising a comparably high delay, in particular if compared with an expected average delay, a signal slew, and/or a placement of a device within a layout of the electronic circuit. The placement of the device may describe a geographical position of a device within a chip or circuit layout in terms of coordinates relative to, e.g., a corner of a circuit.

According to one or more other embodiments of the method, a color rendering attribute and/or test point design quality parameter may be assigned to a test point relating to a design problem area. This way, a designer may obtain high quality advice to address design flaws which even an unexperienced circuit designer may use without in-depth analysis of the endpoint report and years of experience.

According to another embodiment of the method, the test point may be selected out of the group comprising a pin, a wire delay, an adjust, a device delay, and an assertion. This way, different basic categories of root causes may be addressed. These may be analyzed in more detail. As one specific example, a delay category analysis may be performed to identify potentially dispensable inverter chains of a selected path, such as a critical path, in the endpoint report for the design of the electronic circuit.

According to a further embodiment of the method, and in the case the design quality parameter is a placement, the method may comprise determining a previous or penultimate test point position, determining a placement delta of a current test point in relation to the previous or penultimate test point position, loading a global path direction vector, determining whether the placement delta is following the global path direction vector, determining whether the placement delta is above an ignore placement mismatch threshold; and determining whether the placement delta is above a critical placement mismatch threshold. These steps of the method may ensure that comparable short wire lengths are used and that components actually belonging functionally together may be placed in close proximity to each other.

In accordance with a further embodiment and in the case the test point is of a type wire delay, the method may comprise determining a source pin load and a related sink pin slew. This way detailed information may be generated about specific wires connecting devices of the electronic chip.

In accordance with a further embodiment and in the case the test point is of a type device delay, the method may comprise analyzing a device, an inverter chain, a buffer, and/or a latch. The device itself may cause a high delay. Also in the case the device may be a buffer or a latch, these devices may undergo device-specific tests.

According to another embodiment of the method, the analyzing the device may comprise determining at least one out of the group comprising a device voltage threshold, a device primary output slew, a device primary output load in comparison to a device size, and a device fan out value. These parameters of the device have proven to be, e.g., critical in the sense of design flaws. A further investigation may be required.

If, according to an embodiment of the method, the device analyzed may be a buffer, the method may comprise determining a warning threshold value and an error threshold for a primary input slew of a buffer, and in the case the buffer primary input slew may be better than a primary output slew of the buffer, an obsolete buffer error message may be reported, and in the case the buffer primary input slew may be better than an error threshold, an obsolete buffer error message may be reported. This way, different levels of design flaws may be detected and different recommendations may be given to a designer.

If, according to an additional embodiment of the method, the device analyzed may be a latch, the analyzing the device may comprise identifying a latch type, and loading a local clock wire delay, a slew, and a fan out from a previous test point in the selected path. These may be compared to gain a deeper understanding of circuit design deficiencies.

Figure 3:
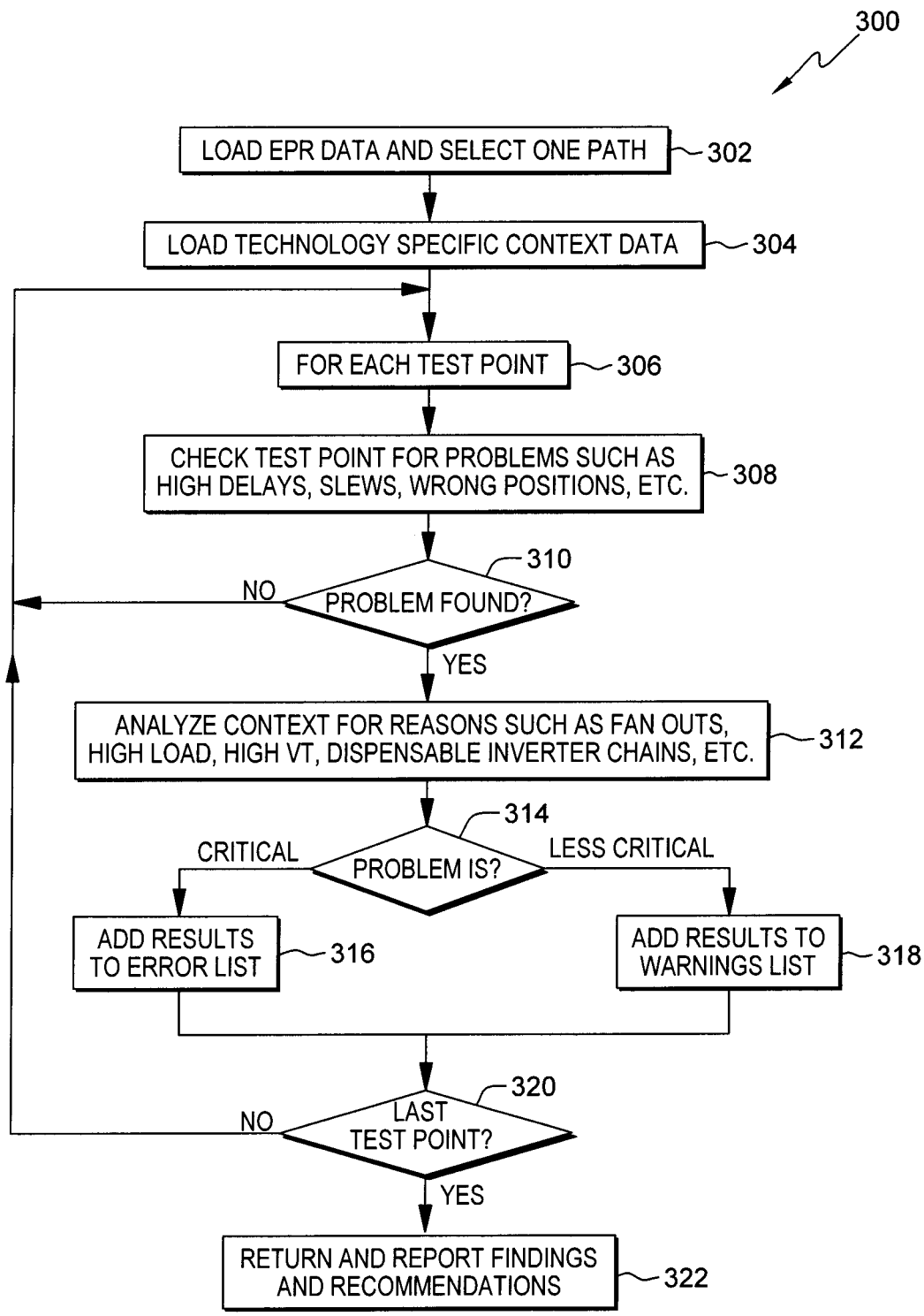
FIG. 3 depicts a more detailed process for analyzing an endpoint report for a design of an electronic circuit, in accordance with one or more aspects of the present invention.

FIG. 3 shows a more detailed process 300 of analyzing an endpoint report, in accordance with one or more aspects of the present invention. The process 300 starts with loading endpoint report (EPR) data into a method related analysis tool and selecting a path, e.g., a critical path 302. Next, technology specific context data may also be loaded 304. Then a loop process, starting at block 306 and ending at block 320, is performed. A test point may be checked for problems regarding high delays, slews, wrong positions and so on, as examples 308. If the problem may be found, 310, case "yes", a context for reasons, like fan outs, high load, high voltage threshold (VT), dispensable inverter chain, and so on may be analyzed 312. If it is determined that the problem is critical 314, then the results may be added to an error list 316. If it is determined that the problem is less critical 314, then the results may be added to a warnings list 318.

If no problems are found (compare determination point 310) or if the last test point has not been reached, 320, then the process returns back to the beginning of the loop 306. Otherwise, the findings and recommendations are reported and, for instance, displayed in a graphical form to a user 322.

Figure 4:
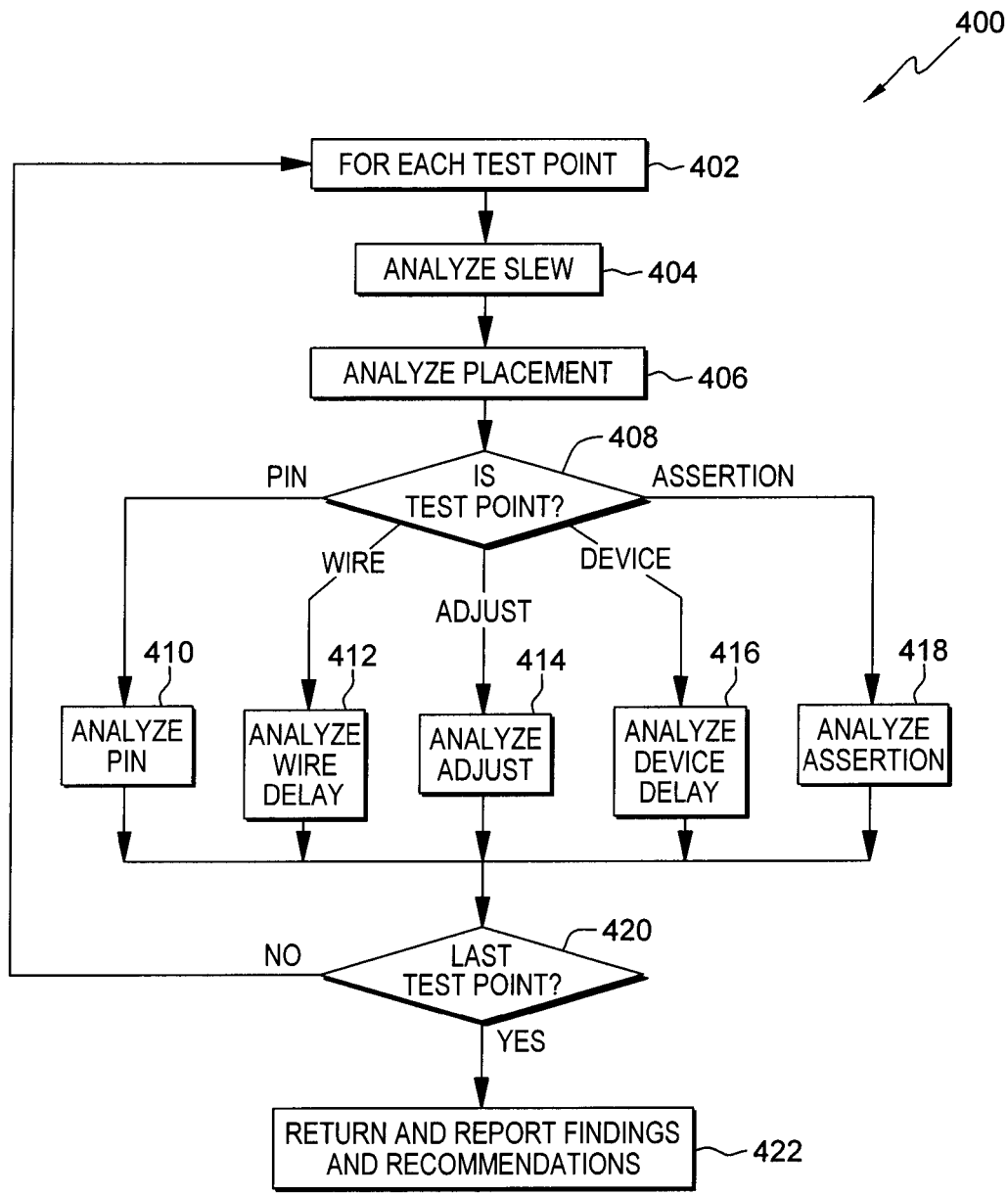
FIG. 4 illustrates a process embodiment for analyzing test points of an endpoint report for a design of an electronic circuit, in accordance with one or more aspects of the present invention.

FIG. 4 shows one example of a process 400 of how to analyze test points of an endpoint report, in accordance with one or more aspects of the present invention. For each test point 402, a slew may be analyzed 404, and a placement of a device may be analyzed 406. It may be determined 408, what characteristic the test point may have. The test point may be a pin of a device, a wire, an adjust, a device, or an assertion, as examples. In each of the cases, a specific analysis may be performed; namely, an analyze pin procedure 410, an analyze wire delay procedure 412, an analyze adjust procedure 314, an analyze device delay (such as an inverter chain) procedure 416, and an analyze assertion procedure 418. In case not all test points have been analyzed 420, the process may return back to the beginning 402. Otherwise, the findings and recommendations may be returned and reported 422.

For special pins, like macro or unit primary output pins (PO), a load check may be performed. If the PO load value exceeds the related threshold value, an error or warning may be reported that recommends reducing the PO load in order to avoid electro-migration issues. The threshold values may be different for macros and units, since units may drive higher loads due to larger buffers.

When the unit timing context is available, an additional check may be performed for macro input and output pins. The unit integration report may be parsed together with the unit timing data and may contain information about macro pins that are not optimally placed and cause superfluous wire delay (this excessive delay may be called "credit"). The method may search for the macro pins of the test point in this report. If found, it may extract the pin credit values and compare them against the error and warning threshold values. If the pin credit value is higher than the threshold value, it highlights the pin in the report and generates a text message that recommends moving the pin and indicates the potential of timing improvement that may be achieved by the move.

For instance, for each macro (or unit) input and output pin, the assertions may be compared for excessive differences. When timing data is loaded, the assertions used to build the macro, as well as those newly generated by the unit timing run (to be used in a next macro build iteration), are loaded as well. The method may compare the arrival time and output pin load values on these assertions. If the differences exceed the threshold, a warning or error may be reported, recommending refreshing the assertions for the next macro build iteration. In addition, the asserted PO load value may be checked against threshold values. If it exceeds a threshold, an error or warning may be written that recommends reducing the PO load in order to avoid electro migration issues. The thresholds may be different for macros and units, since units can drive higher loads due to larger buffers.

For each adjust test point, a check may be performed to verify whether the adjust value is above the warning or error threshold. Such errors and warnings may be highlighted and reported together with the recommendation to modify the wire in order to reduce the coupling. In addition, all adjust values may be accumulated and the sum may be compared against warning and error thresholds for the overall adjusts in the path. In case the adjust sum may exceed the thresholds, an overall warning or error for the wire quality of this path may be reported.

As noted, for high-performance and/or high-frequency circuits, a significant limitation on the operational capability of the circuit is its timing characteristics. A circuit can only fulfill a desired timing specification if the switching speed is sufficiently fast. To test whether a circuit's timing characteristic is within a timing specification, late mode timing analysis may be performed and used to analyze timing fails in the endpoint report. As discussed, the endpoint report typically contains a set of timing paths that report, in part, an amount of failure, using the so-called late-mode slack. A principal goal of the circuit design process is to modify a circuit design until no more late-mode paths with negative slack are reported.

One possible design flaw is the presence of an inverter chain which does not contribute to the logical function of the circuit, but only delays the signal and leads to or causes a timing fail. Certain inverter chains are beneficial, such as those needed to power up signals, or to drive large fan-outs. Other inverter chains are introduced by the design synthesis tool due to misplaced pins or devices in the circuit design, or due to a bad wire quality specification. These later reasons can be identified and corrected by the designer. Currently, however, the circuit designer's experience is required to find any dispensable or obsolete inverter chains, and the reasons causing them to be dispensable, based on data reported in an endpoint path of the endpoint report.

Advantageously, disclosed herein are automated approaches to detecting dispensable (for instance, obsolete) inverter chains based on an endpoint report path, or alternatively, based on a similar path created based on a circuit net list.

Circuit synthesis tools typically contain methods to analyze timing and improve a circuit design, but the results are not perfect. They often introduce inverter chains, one or more of which may be obsolete or potentially dispensable inverter chains. Conventionally, a large amount of failing paths still need to be manually analyzed, and a human needs to distinguish between necessary or good inverter chains and dispensable inverter chains, as well as determine what design changes may be pursued to eliminate a dispensable inverter chain from the design.

Described herein therefore is an automated approach to detect dispensable inverter chains in endpoint paths based, in part, on endpoint report timing data. In operation, a designer owning a circuit design may select one of the timing endpoint report paths with negative slack in order to analyze the path further to find the reason causing the negative slack. For instance, all inverter chains in a path may be detected, and then, for each chain, the chain topology and inverter gains (and fan-outs and sizes) within the chain may be used to analyze the chain. If the inverter chain does not fulfill certain predefined criteria, then the inverter chain may be marked as dispensable (e.g., obsolete), and reported out or highlighted to a circuit designer or automated circuit design tool for removal.

As explained further below, inverter gain and macro primary output (PO) fan-out, the context or topology of the chain in the circuit, the distance the chain has to bridge, etc., may be considered and used to influence a decision criterion, referred to herein as the chain criticality value. When these elements are analyzed, the resultant chain criticality value may be compared against, for instance, two threshold values, such as a warning threshold value and an error threshold value, and if the chain criticality value fails one or both compares, then the chain may be reported as potentially dispensable based on a warning, or dispensable based on an error flag. The resultant report may be augmented with recommendations on how to resolve the possible reason(s) that caused the design synthesis tool to introduce the dispensable inverter chain. For example, if an inverter chain starts from a macro primary input (PI), the report may recommend moving the PI closer to the inverter chain end location. If the inverter chain ends at a macro primary output pin (PO), and the chain is reported dispensable, then the report may recommend moving the PO closer to the inverter chain begin location. If a dispensable inverter chain ends with a latch, the report may recommend to check whether the latch position has been locked, and thereby cause the chain creation by synthesis. As another example, if a dispensable inverter chain starts from a latch, it may be recommended to check whether the latch position has been locked, and thereby cause the chain, or to duplicate this latch, in order to avoid the chain creation by synthesis. In this manner, a designer automatically receives recommendations to improve a circuit design, without intensely requiring analysis of the endpoint path. The findings and resulting recommendations can be displayed in an augmented representation of the endpoint report path, and/or in addition as textual recommendations.

Generally stated, disclosed herein are a computer-implemented method, computer system, and computer program product for analyzing an endpoint report for a design of an electronic circuit. The method includes, for instance, ascertaining, by a processing device, that one or more test points of a selected path (e.g., critical path) of the endpoint report are associated with one or more inverter devices of an inverter chain of the design of the electronic circuit; establishing, by the processing device, a chain criticality value for the inverter chain; and determining, by the processing device, whether to identify the inverter chain as a dispensable (e.g., obsolete) inverter chain, the determining using, at least in part, the chain criticality value for the inverter chain.

In one or more implementations, establishing the chain criticality value may include updating the chain criticality value for each inverter device of the inverter chain, where the chain criticality value may be a summed value obtained from criticality values determined for each of the one or more inverter devices of the inverter chain.

In one or more embodiments, establishing the chain criticality value for the inverter chain may include updating the chain criticality value by a criticality value for an inverter device in the inverter chain, where the criticality value is determined, at least in part, using a fan-out number for a previous inverter device in the inverter chain (PreviousInverterFO).

In one or more embodiments, establishing the chain criticality value may include updating, for an inverter device in the inverter chain, the chain criticality value by a criticality value determined, in part, by a gain value associated with the inverter device. The gain value may be determined as a current inverter size of the inverter device (CurrentInverterSize) divided by a previous inverter size of a previous inverter device in the inverter chain (PreviousInverterSize).

In one or more implementations, establishing the chain criticality value may include, for an inverter device in the inverter chain, adding a criticality value to the chain criticality value. The criticality value may be determined as a preset number n, such as n=3, divided by (the value of the gain multiplied by the fan-out number for the previous inverter device in the inverter chain (PreviousInverterFO)). In such an embodiment, the gain may be determined as the current inverter size of the inverter device divided by a previous inverter size of a previous inverter device in the inverter chain.

In a further embodiment, determining whether to identify the inverter chain as a dispensable inverter chain may include, in part, ascertaining whether the chain criticality value divided by a number of inverter devices in the inverter chain is greater than a set threshold, and if so, identifying the inverter chain as a dispensable inverter chain. Alternatively, or further, the inverter chain may be identified as a dispensable or obsolete inverter chain where a device message flag has been set, associated with one or more inverter devices of the inverter chain. In one or more implementations, the device message flag may be set if a criticality value determined for the inverter device is greater than one or more criticality value thresholds, such as a warning threshold, and/or an error threshold.

Still further, the method may include determining to identify the inverter chain as a dispensable inverter chain where a number of inverter devices in the inverter chain is greater than or equal to a predefined number of inverter devices. For instance, if the inverter chain contains three or more inverter devices, the chain may be automatically identified as potentially dispensable, requiring further analysis.

As explained further below, in one or more implementations, the method may also include determining a final chain criticality value for the inverter chain by modifying the chain criticality value based upon one or more characteristics of the inverter chain. The one or more characteristics may include: an input fan-out of a first inverter device in the inverter chain; an output load of a last inverter device in the inverter chain; whether the inverter chain starts after a macro primary input (PI); whether the inverter chain feeds a macro primary output (PO); or a distance between a last pin (or last device) of the electronic circuit before the inverter chain, and a first pin (or first device) of the electronic circuit after the inverter chain.

Figure 5:
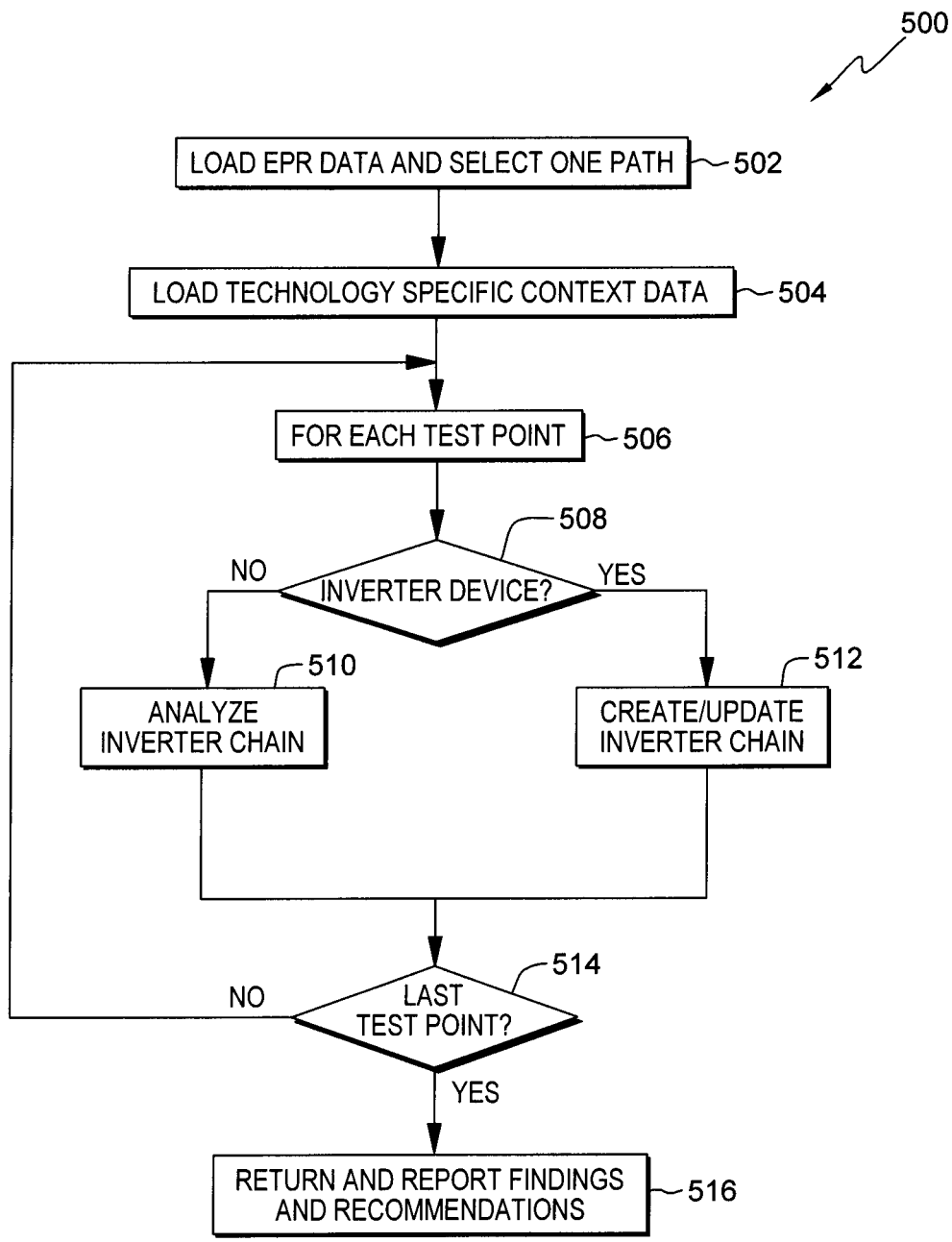
FIG. 5 shows one embodiment of a process of analyzing an endpoint report for potentially dispensable inverter chains, in accordance with one or more aspects of the present invention.

FIG. 5 depicts one embodiment of a process for automatically analyzing a timing endpoint report for a design of an electronic circuit, in accordance with one or more aspects of the present invention. The automated approach may be implemented, for instance, as part of the analyze device delay 416 process of FIG. 4, and in one or more embodiments, is able to distinguish between advantageous and dispensable inverter chains. For instance, an advantageous or good inverter chain may be an inverter chain which powers up signals to drive a macro primary output(s) (PO) with high load(s), to power up signals to drive large fan-outs, or to power up signals to bridge large distances. Conversely, an obsolete or dispensable inverter chain may drive signals with small fan-outs, may start after a macro primary input (PI), or drive a small macro primary output (PO), both of which may be an indication of a pin placement issue. In addition, a dispensable inverter chain may bridge large distances that are caused by bad device placement, or have too many inverters due to, for instance, a thin wire being selected in the design, such as an inexpensive wire code in the design.

In one or more implementations, the automated approach disclosed herein to evaluating inverter chains of a design may utilize, for instance, inverter size and gain, chip topology, including fan-outs, and start and endpoint-related devices and/or pins, as explained further below.

Referring to FIG. 5, in one or more implementations, process 500 may include loading endpoint report (EPR) data into a method-related analysis tool, and selecting a path, for instance, a critical path 502. Next, technology-specific context data may be loaded 504. For instance, technology-specific context data may include thresholds, phases, typical delays, threshold voltages, etc.

A loop process, starting at block 506, and ending at block 514, is performed for each test point in the selected test path. For each test point 506, processing determines whether the test point is associated with an inverter device 508. If "yes", then an inverter chain list may be created (for the first inverter device in a chain) or updated (for the second and later inverter devices in the chain), which may include a list of test points associated with the inverter chain 512. Processing determines whether the last test point in the selected test path has been reached 514, and if "no", returns to obtain a next test point 506. If the next test point is not associated with an inverter device 508, then processing analyzes the inverter chain just completed 510. Once all test points of the test path have been processed, meaning that all inverter chains in the test path have been processed, processing for the selected path is complete and the findings and recommendations are reported.

Figure 6:
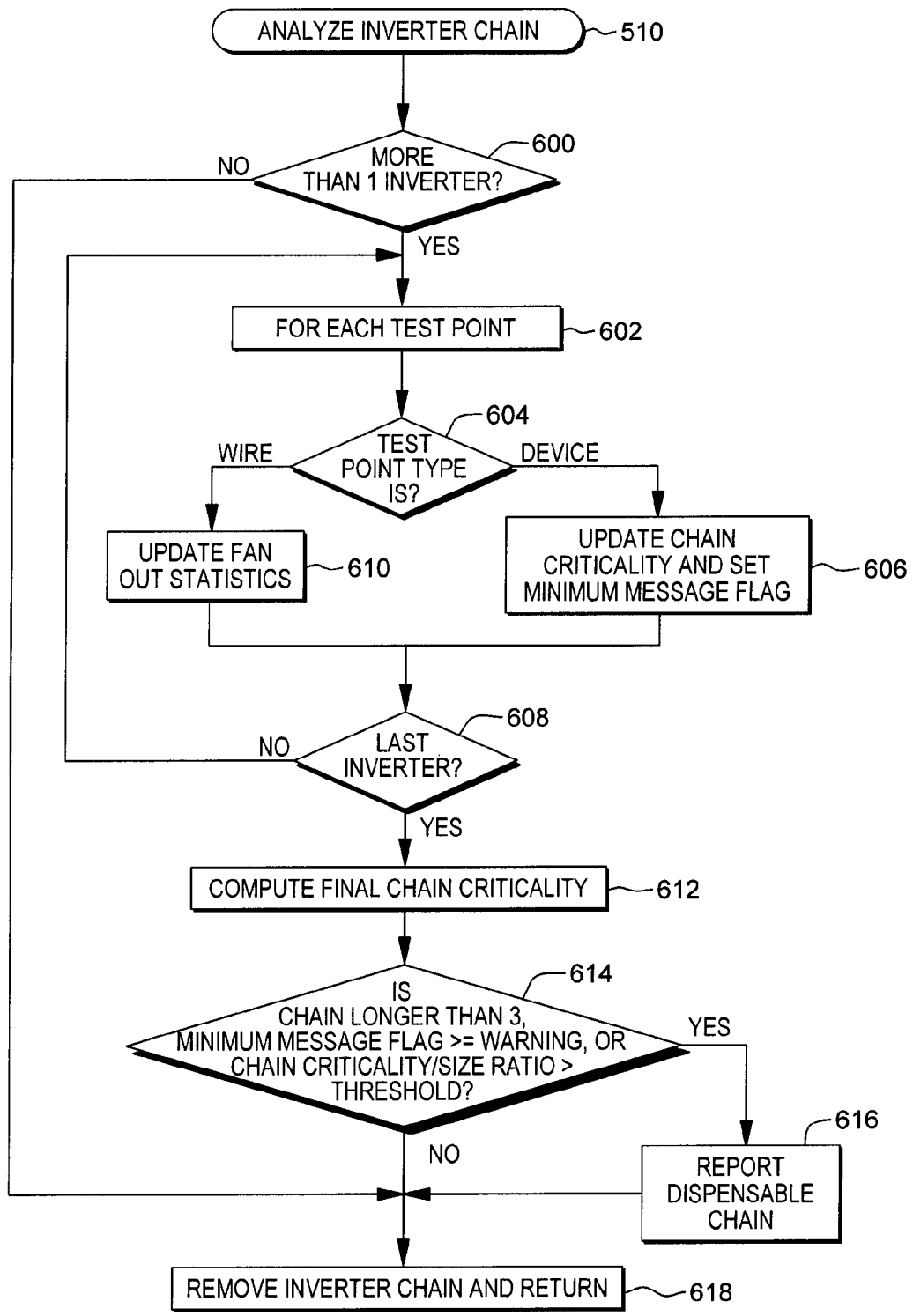
FIG. 6 illustrates one embodiment of a process for analyzing an inverter chain to establish a chain criticality value, in accordance with one or more aspects of the present invention.

FIG. 6 depicts one embodiment of a process for analyzing an inverter chain 510. Initially, processing determines whether the inverter chain has more than one inverter 600. If "no", then the inverter chain is removed and processing returns 618. Assuming that there is more than one inverter device in the inverter chain, then a loop process, starting at block 602, and ending at block 608, is performed. Specifically, for each test point 608 in the list of test points that are part of the current inverter chain, processing determines the test point type 604. In one or more implementations, the test point type may be either a device-type or a wire-type. If the test point is a device-type, then the chain criticality value for the inverter chain is updated, and a minimum message flag is set 606. In one or more implementations, the chain criticality value may be determined or updated per inverter device in the inverter chain. For instance, in one or more embodiments, the chain criticality value may be defined as the sum of the criticality values for the inverter devices in the inverter chain. As a specific example, in one or more implementations, the criticality value of an inverter device may be determined by a formula, such as:

$$\text{Criticality Value} = \frac{3}{\text{Gain} \times \text{PreviousInverterFO}}$$

wherein:

$$\text{Gain} = \frac{\text{CurrentInverterSize}}{\text{PreviousInverterSize}},$$

PreviousInverterFO=Number of fan-out (FO) wires associated with a previous inverter device in the inverter chain;

CurrentInverterSize=An inverter size of the inverter device; and

PreviousInverterSize=An inverter size of the previous inverter device in the inverter chain.

Note that the number "3" represents one example of the numerator constant, and that other values may be selected, if desired, for a particular analysis. In one or more embodiments, the number "3" may be the optimum gain for maximum circuit speed. A higher gain might overload the first inverter, and thus make it slower, while a lower gain may be a waste of chained circuit devices, and make the circuit slower by having too many devices in the critical path. In one or more embodiments, the optimum criticality value for an inverter device is a value of 1, which once determined is added to the chain criticality value. Further, in one or more embodiments, an added criticality value of 1.2 may set a warning flag, while a value of 2 or greater may set an error flag, which may be reported out as described herein.

Once the chain criticality value is updated, processing determines whether the last inverter device has been processed in the current inverter chain 608. If "no", then processing returns to obtain a next test point in the list of test points obtained for the current inverter chain. If the test point is a wire-type test point, then the fan-out statistics for the associated inverter device may be updated 610. In one or more implementations, processing may maintain a short text with chain fan-out values, such as "1:2:3:5" for later reporting. Processing may also maintain a maximum fan-out ($FO_{max}$) and a fan-out sum ($FO_{sum}$) over the complete chain for later evaluation when computing, for instance, a final chain criticality value. The fan-out sum may be the sum of the fan-outs of each inverter device in the chain.

Once the last inverter in the current inverter chain has been processed through the loop, then, in one or more implementations, a final chain criticality value 612 is determined. One detailed embodiment for determining a final chain criticality value is described below with reference to FIG. 7.

After the final chain criticality value has been determined, processing determines whether the inverter chain is longer than 3 devices, or if the message flag has been set to a warning flag, or an error flag, or whether the chain criticality value divided by the size ratio of the inverter chain is greater than a set threshold 614. In one or more implementations, the set threshold may be 1, where the chain criticality value is divided by (inverter chain size+1.5), and a determination is made whether the result is greater than 1. If "yes" to any of these considerations, then processing may automatically report or identify the inverter chain as a potentially dispensable inverter chain 616, after which the inverter chain is removed from the maintenance list of step 512 (FIG. 5), and processing returns to the point of call, for instance, the analyze inverter chain 514 block of the process 500 of FIG. 5.

Figure 7:
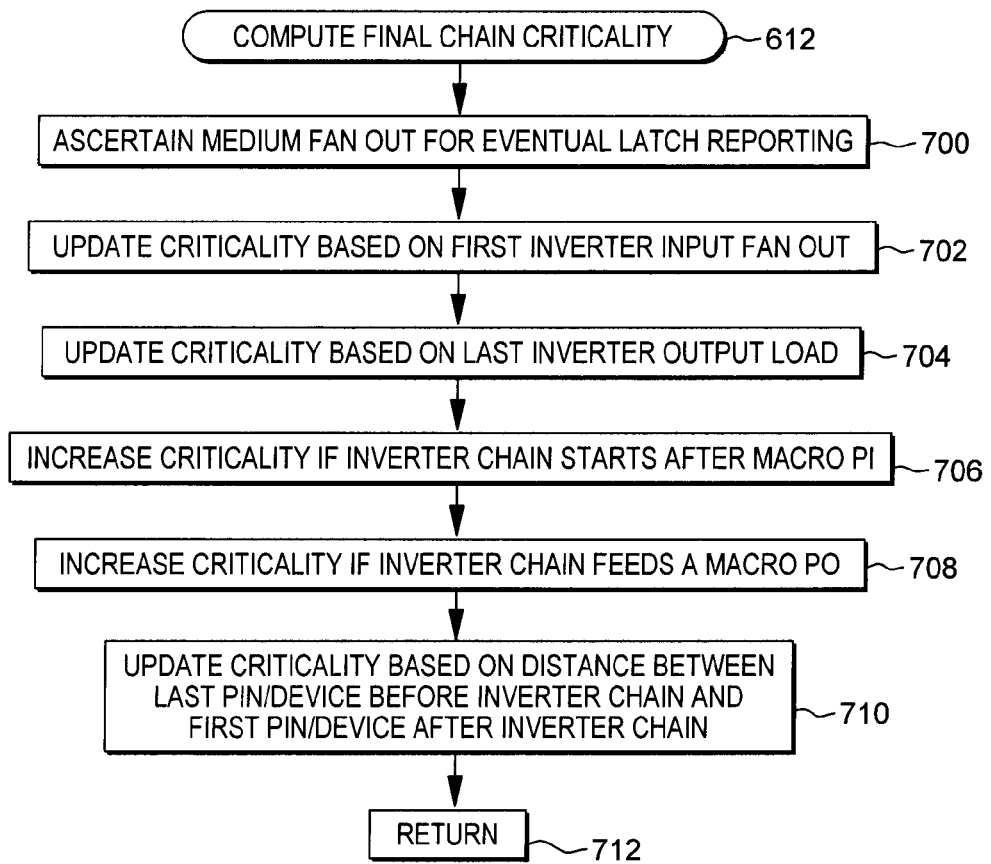
FIG. 7 depicts one embodiment of a process for establishing a final chain criticality value, which takes into consideration one or more characteristics of the inverter chain, in accordance with one or more aspects of the present invention.

As noted, FIG. 7 depicts one embodiment of a process for determining a final chain criticality value 612. Referring to FIG. 7, a medium fan-out value (medium FO) for eventual latch reporting may be determined 700. In one or more implementations, the medium fan-out value may equal the sum of the device fan-outs ($FO_{sum}$) divided by the inverter chain size. If the inverter chain begins from a latch, and either the medium fan-out is greater than 1.5, or the maximum fan-out is greater than 2, then the report may recommend cloning this latch.

Processing may update the chain criticality value based on the first inverter input fan-out 702. For instance, the chain criticality value may be updated by 1.5 divided by the first inverter input fan-out value. Further, the chain criticality value may be updated based on the last inverter output load 704. For instance, the chain criticality value may be updated by a value equal to the output pin load divided by (5×LastInverterSize), in one or more implementations, where the pin load may be in femtoFarad, and the inverter size is in micrometers.

The chain criticality value may be increased if the inverter chain begins after a macro primary input (PI) 706. If true, the chain criticality value may be increased by, for instance, a value of 1. Further, the chain criticality value may be increased if the inverter chain feeds a macro primary output (PO) 708. In such a case, the chain criticality value may further be, for instance, increased by a value of 1.

Additionally, the chain criticality value may be updated based, for instance, on a distance between the last pin (or last device) in the circuit design path before the inverter chain begins, and a first pin (or first device) after the inverter chain 710. In one or more technology-dependent examples, the chain criticality value may be decreased by, for instance, mdistance PIPO/400, where the mdistance is the Manhattan distance between the chain input pin and output pin in micrometers. Once the final chain criticality value is obtained, processing returns to place of call 712, such as the compute final chain criticality value step 612 of the FIG. 6 process.

Figure 8:
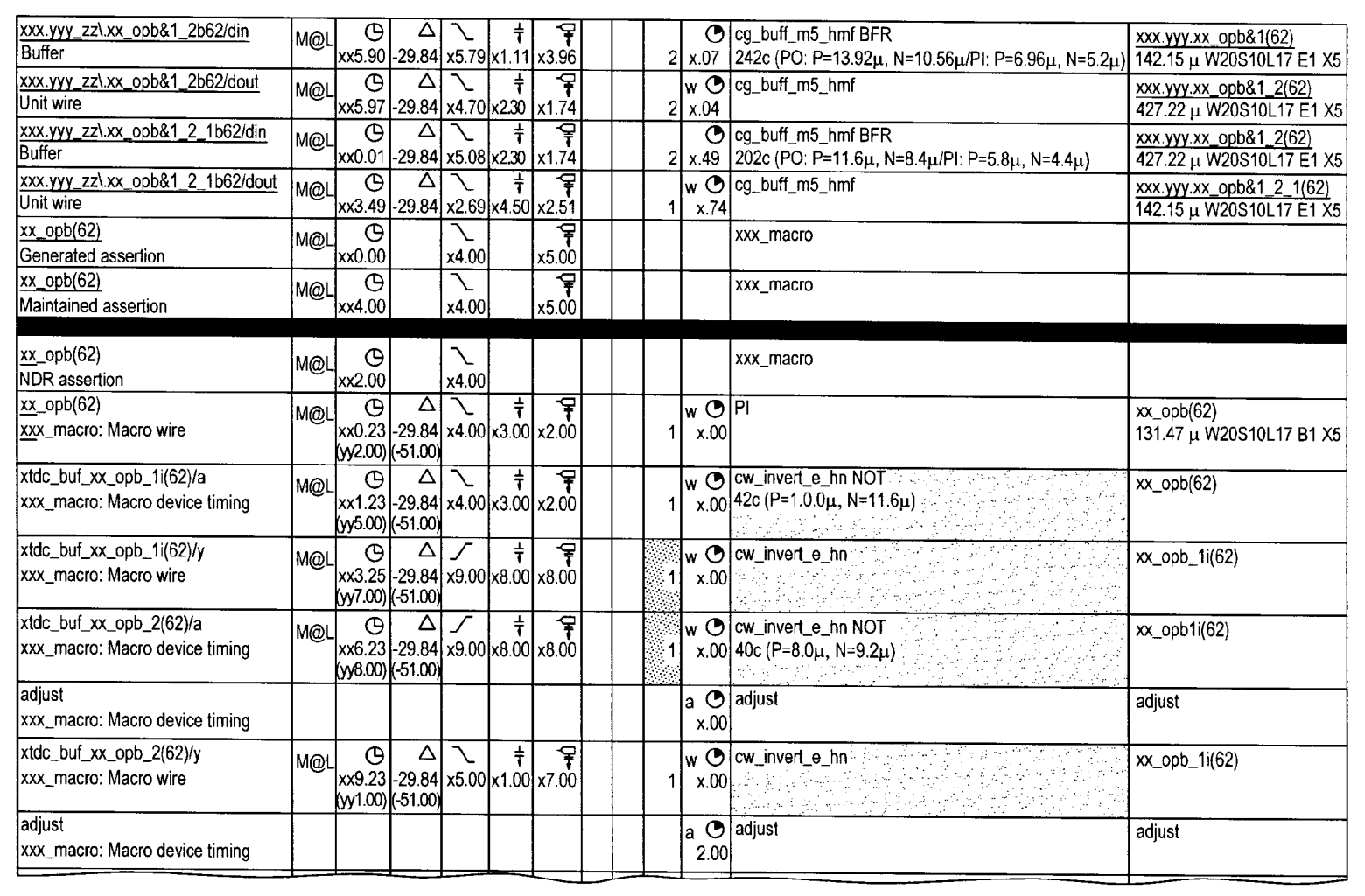

By way of example, FIGS. 8 & 9 depict sample outputs of an automated tool for analyzing an endpoint report, in accordance with one or more aspects of the present invention. As an example, FIG. 8 depicts a sample output of the endpoint report, where highlighting is provided identifying one or more inverter devices or inverter chains which have been identified as potentially dispensable in the circuit design. FIG. 9 depicts similar information, only in a text report format. In one or more embodiments, whether in a table or text format, the automated design circuit analysis approach described herein both identifies potentially dispensable inverter chains, as well as offers possible fixes or work-arounds in the circuit design which would, for instance, allow for removal of the inverter chain. In one or more embodiments, with the information provided in the analysis report, a circuit designer could, for instance, remove flagged inverter chains from the design, as well as take one or more further actions recommended in the design circuit analysis report, to reduce the likelihood that the design synthesis tool will reinsert the subject inverter chain with the next electronic circuit design iteration. For instance, based on the analysis performed, the report may recommend moving a macro pin or latch, changing a specified wire size or code, etc.

One or more embodiments of a computing environment to implement one or more aspects of the present invention are described below with reference to FIGS. 10-13.

Figure 10:
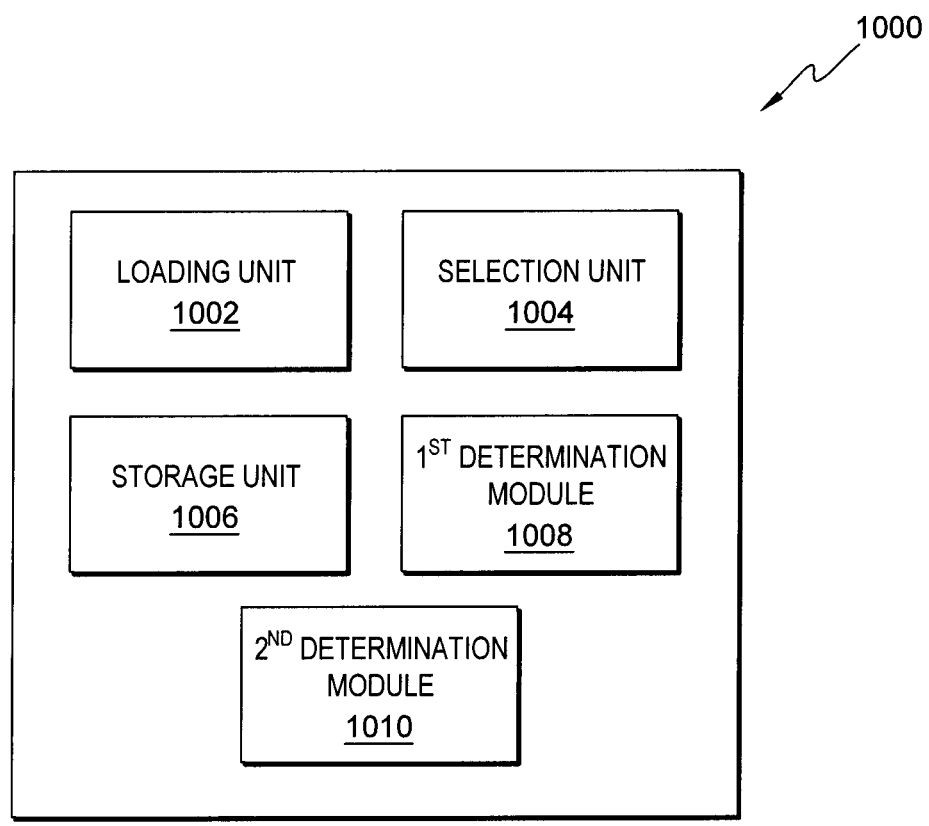
FIG. 10 depicts one embodiment of a design circuit analysis system, in accordance with one or more aspects of the present invention.

FIG. 10 shows one example of a block diagram of an embodiment of a design circuit analysis system 1000, in accordance with one or more aspects of the present invention. The design circuit analysis system may comprise a loading unit 1002 adapted to load results of a static timing analysis run; a selection unit 1004 adapted to select a path from the loaded results; and a storage unit 1006 adapted to provide technology specific context data. Additionally, the design circuit analysis system 1000 may comprise a first ($1^{st}$) determination module 1008 adapted to determine, for one or more (e.g., every) test point of the selected path, design quality parameters for determining a design problem area, and a second ($2^{nd}$) determination module 1010 adapted to determine, for one or more (e.g., every) design problem area, a root cause by analyzing design problem area data in comparison to related ones of the technology specific context data.

Figure 11:
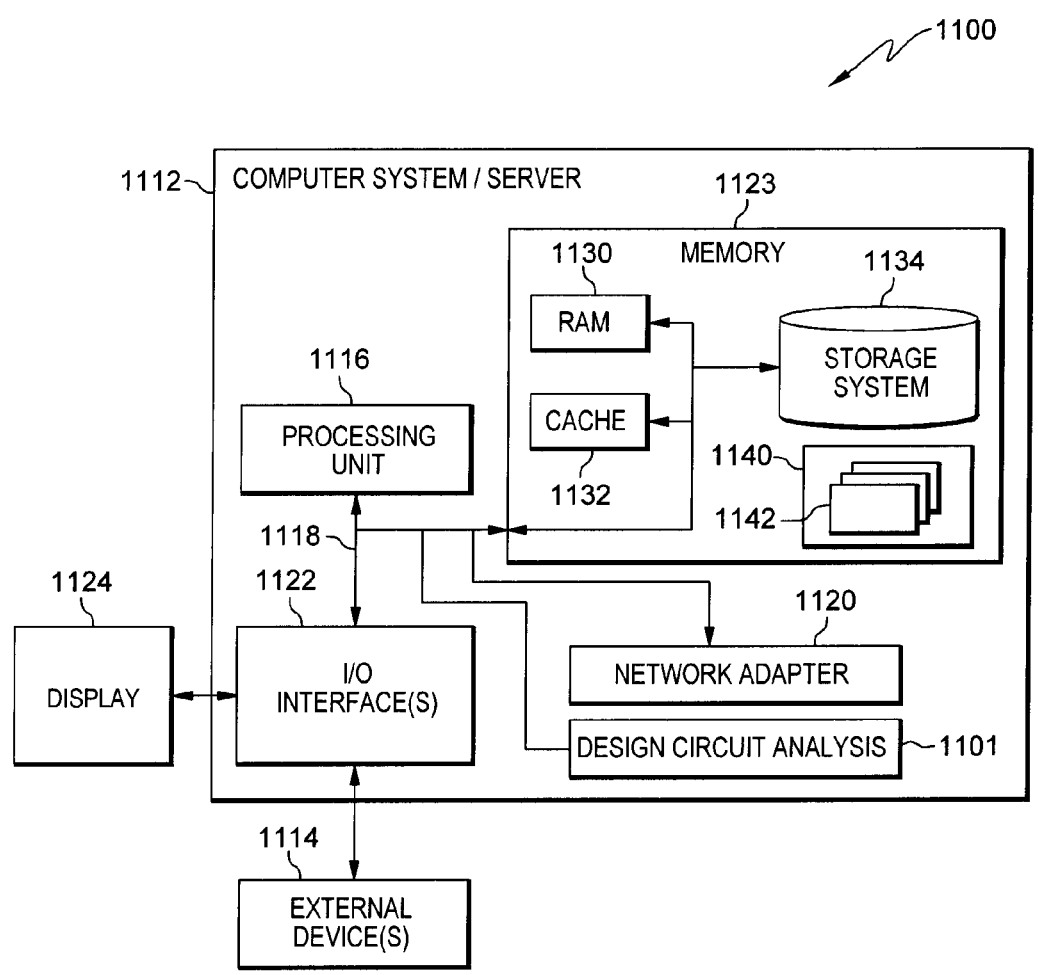
FIG. 11 depicts one example of a computer system/server of a computing environment to incorporate a design circuit analysis process or system, in accordance with one or more aspects of the present invention.

By way of further example, FIG. 11 depicts one embodiment of a computing environment 1100, which includes at least one computer system/server 1102 that is operational with numerous other general purpose or special purpose computing system environments or configurations. Examples of well-known computing systems, environments, and/or configurations that may be suitable for use with computer system/server 1102 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1102 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 11, computer system/server 1102 is shown in the form of a general-purpose computing device. The components of computer system/server 1102 may include, but are not limited to, one or more processors or processing units 1106, a system memory 1108, and a bus 1110 that couples various system components including system memory 1108 to processor 1106.

In one embodiment, processor 1106 is based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 1110 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1102 typically includes a variety of computer system readable media. Such media may be any available media that is accessible by computer system/server 1102, and it includes both volatile and non-volatile media, removable and non-removable media.

System memory 1108 can include computer system readable media in the form of volatile memory, such as random access memory (RAM) 1112 and/or cache memory 1114. Computer system/server 1102 may further include other removable/non-removable, volatile/non-volatile computer system storage media. By way of example only, storage system 1116 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1110 by one or more data media interfaces. As will be further depicted and described below, memory 1108 may include at least one program product having a set (e.g., at least one) of program modules that are configured to carry out the functions of embodiments of the invention.

Program/utility 1120, having a set (at least one) of program modules 1122, may be stored in memory 1108 by way of example, and not limitation, as well as an operating system, one or more application programs, other program modules, and program data. Each of the operating system, one or more application programs, other program modules, and program data or some combination thereof, may include an implementation of a networking environment. Program modules 1122 generally carry out the functions and/or methodologies of embodiments of the invention as described herein.

Computer system/server 1102 may also communicate with one or more external devices 1130 such as a keyboard, a pointing device, a display 1132, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1140. Still yet, computer system/server 1102 can communicate with one or more networks such as a local area network (LAN), a general wide area network (WAN), and/or a public network (e.g., the Internet) via network adapter 1150. As depicted, network adapter 1150 communicates with the other components of computer system/server 1102 via bus 1110. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

Additionally, a design circuit analysis system tool 1101, such as the design circuit analysis system 1000 of FIG. 10, may optionally be attached to the bus system.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 11. Computer system/server 1102 of FIG. 11 may be practiced in distributed cloud computing environments where tasks are performed by remote processing devices that are linked through a communications network. In a distributed cloud computing environment, program modules may be located in both local and remote computer system storage media including memory storage devices. Computer system/server 1102 is capable of being implemented and/or performing any of the functionality set forth hereinabove.

Figure 12:
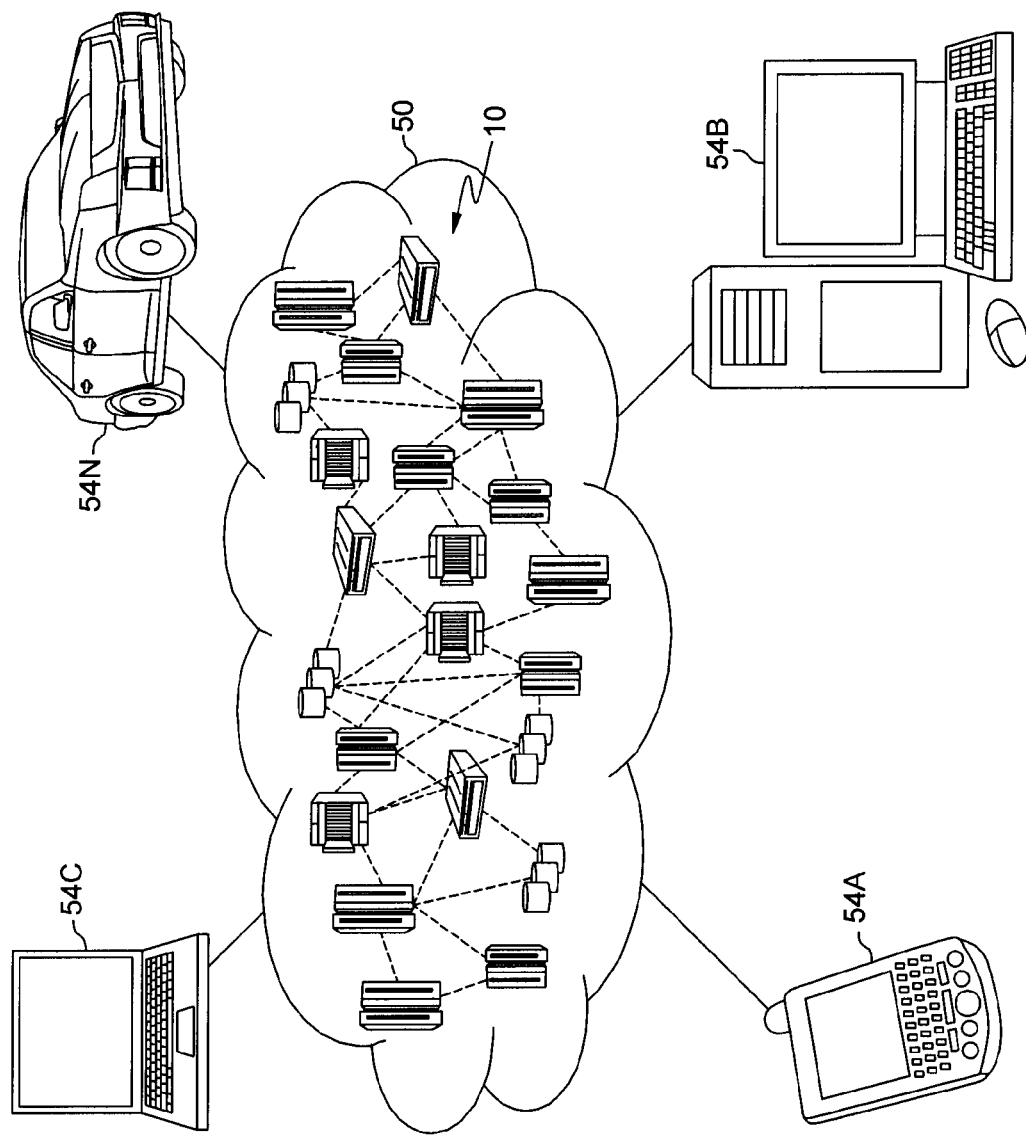
FIG. 12 depicts one embodiment of a cloud computing environment, which may implement one or more aspects of the present invention.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
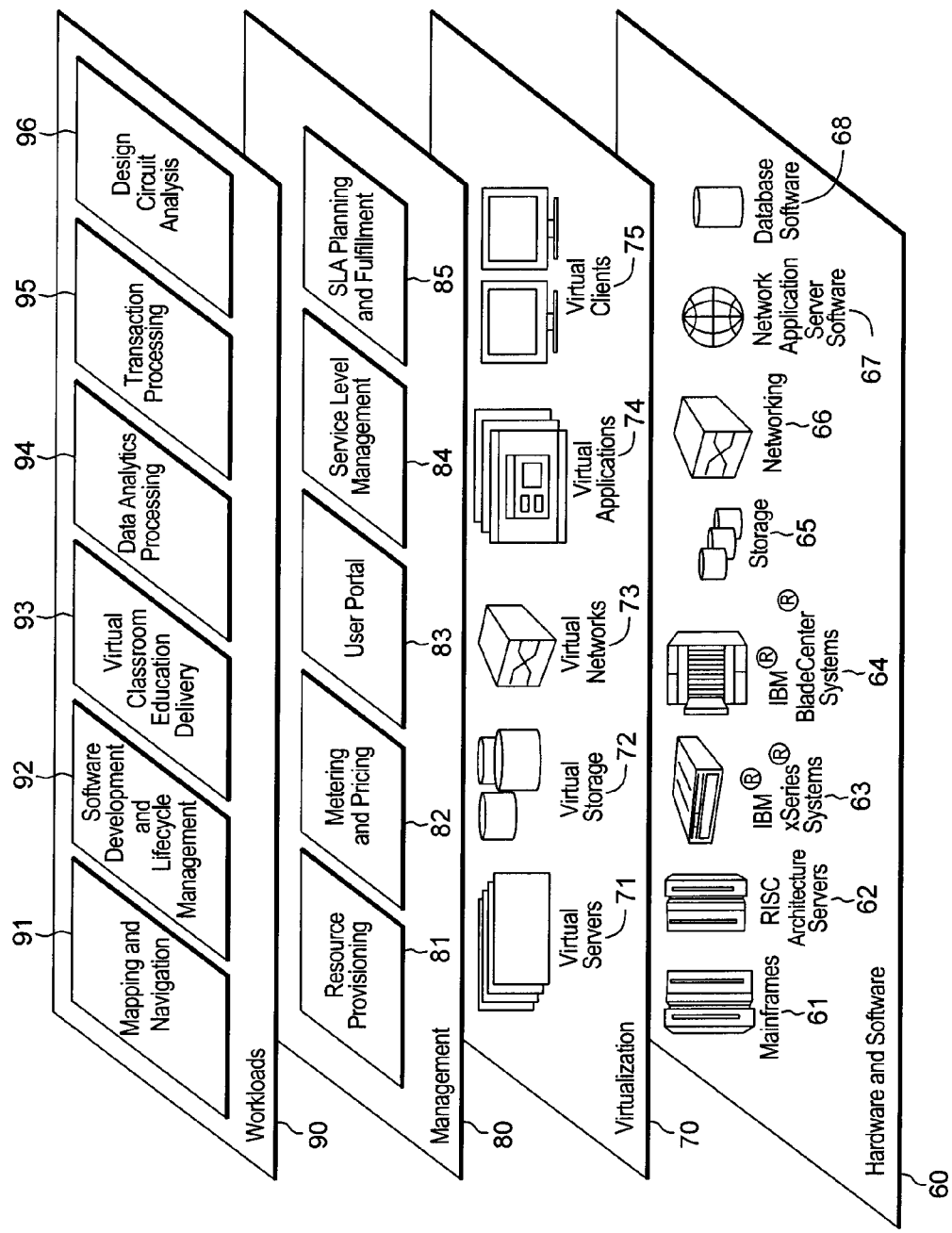
FIG. 13 depicts an example of extraction model layers which may use or implement a design circuit analysis process, in accordance with one or more aspects of the present invention.

Referring now to FIG. 13, a set of functional abstraction layers provided by cloud computing environment 50 is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Design Circuit Analysis 96.

As described herein, according to one or more aspects of the present invention, a method for analyzing an endpoint report for a design of an electronic circuit may be provided. The method may include loading results of a static timing analysis run, selecting a path from the loaded results, and providing technology specific context data. Furthermore, the method may include determining, for every test point of the selected path, design quality parameters for determining a design problem area, as well as determining, for every design problem area, a root cause by analyzing design problem area data in comparison to related ones of the technology specific context data.

According to one or more other aspects of the present invention, a design circuit analysis system may be provided. The design circuit analysis system may include a loading unit adapted for loading results of a static timing analysis run, a selection unit adapted for a selection of a path from the loaded results, and a storage unit adapted for providing technology specific context data.

Additionally, the design circuit analysis system may include a first determination module adapted for a determination, for every test point of the selected path, of design quality parameters for determining a design problem area, and a second determination module adapted for a determination, for every design problem area, of a root cause by analyzing design problem area data in comparison to related ones of the technology specific context data.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

It should be noted that embodiments of the invention are described with reference to different subject-matters. In particular, some embodiments are described with reference to method type claims whereas other embodiments have been described with reference to apparatus type claims. However, a person skilled in the art will gather from herein that, unless otherwise notified, in addition to any combination of features belonging to one type of subject-matter, also any combination between features relating to different subject-matters, e.g., between features of the method type claims, and features of the apparatus type claims, is considered as to be disclosed within this document.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

Aspects of the present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage into a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other devices to produce a computer implemented process, such that the instructions which execute on the computer, other programmable apparatus, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of facilitating design and manufacture of an electronic circuit, the computer-implemented method comprising:

performing a static timing analysis run of the design of the electronic circuit, the static timing analysis run producing an endpoint report;

providing a computer tool to facilitate enhancing the design of the electronic circuit to meet predefined design criteria, the computer tool facilitating:

ascertaining, by a processing device, that one or more test points of a selected path of the endpoint report are associated with one or more inverter devices of an inverter chain of the design of the electronic circuit;

establishing, by the processing device, a chain criticality value for the inverter chain relative to electronic circuit performance;

determining, by the processing device, whether to identify the inverter chain as a dispensable inverter chain, the determining using, at least in part, the chain criticality value for the inverter chain;

based on the determining identifying the inverter chain as a dispensable inverter chain, indicating that the inverter chain is dispensable, the indicating facilitating enhancing the design of the electronic circuit through revision of the design of the electronic circuit to produce a revised design of the electronic circuit; and initiating manufacture of the electronic circuit pursuant, at least in part, to the revised design of the electronic circuit.

2. The method of claim 1, wherein the establishing comprises updating the chain criticality value for each inverter device of the inverter chain, the chain criticality value being a summed value obtained from criticality values determined for the one or more inverter devices of the inverter chain.

3. The method of claim 1, wherein the establishing comprises updating the chain criticality value by a criticality value for an inverter device in the inverter chain, the criticality value being determined, in part, using a fan-out number for a previous inverter device in the inverter chain (PreviousInverterFO).

4. The method of claim 1, wherein establishing the chain criticality value comprises updating, for an inverter device in the inverter chain, the chain criticality value by a criticality value determined, in part, by a gain value associated with the inverter device, the gain value being determined as a current inverter size of the inverter device divided by a previous inverter size of a previous inverter device in the inverter chain.

5. The method of claim 1, wherein for an inverter device in the inverter chain, the establishing comprises adding a criticality value to the chain criticality value, wherein the criticality value is determined as:

$$\text{Criticality Value} = \frac{3}{\text{Gain} \times \text{PreviousInverterFO}}$$

wherein:

$$\text{Gain} = \frac{\text{CurrentInverterSize}}{\text{LastInverterSize}};$$

PreviousInverterFO=Number of fan-out (FO) wires associated with a previous inverter device in the inverter chain;

CurrentInverterSize=An inverter size of the inverter device; and

PreviousInverterSize=An inverter size of the previous inverter device in the inverter chain.

6. The method of claim 1, wherein the determining comprises, in part, ascertaining whether the chain criticality value divided by a number of inverter devices in the inverter chain is greater than a set threshold, and if so, identifying the inverter chain as the dispensable inverter chain.

7. The method of claim 1, wherein the establishing comprises ascertaining for an inverter device of the inverter chain a criticality value to be summed into the chain criticality value, and wherein the establishing further comprises setting a device message flag if the criticality value for the inverter device is greater than a criticality value threshold, and wherein the determining comprises identifying the inverter chain as the dispensable inverter chain where the device message flag associated with the inverter device is set.

8. The method of claim 1, wherein the determining further comprises identifying the inverter chain to be the dispensable inverter chain where a number of inverter devices in the inverter chain is greater than or equal to a defined number of inverter devices.

9. The method of claim 1, wherein the establishing comprises establishing a final chain criticality value for the inverter chain by modifying the chain criticality value based upon one or more characteristics of the inverter chain, the one or more characteristics being selected from the group consisting of:

an input fan-out of a first inverter device in the inverter chain;

an output load of a last inverter device in the inverter chain;

whether the inverter chain starts after a macro primary input (PI);

whether the inverter chain feeds a macro primary output (PO); and a distance between a last pin (or last device) of the electronic circuit before the inverter chain, and a first pin (or first device) of the electronic circuit after the inverter chain.

10. A computer system for facilitating design and manufacture of an electronic circuit, the computer system comprising:

a memory; and a processing device in communication with the memory, wherein the computer system performs a method comprising:

performing a static timing analysis run of the design of the electronic circuit, the static timing analysis run producing an endpoint report;

facilitating, via a computer tool, enhancing the design of the electronic circuit to meet predefined design criteria, the facilitating:

ascertaining, by a processing device, that one or more test points of a selected path of the endpoint report are associated with one or more inverter devices of an inverter chain of the design of the electronic circuit;

establishing, by the processing device, a chain criticality value for the inverter chain relative to electronic circuit performance;

determining, by the processing device, whether to identify the inverter chain as a dispensable inverter chain, the determining using, at least in part, the chain criticality value for the inverter chain;

based on the determining identifying the inverter chain as a dispensable inverter chain, indicating that the inverter chain is dispensable, the indicating facilitating enhancing the design of the electronic circuit through revision of the design of the electronic circuit to produce a revised design of the electronic circuit; and initiating manufacture of the electronic circuit pursuant, at least in part, to the revised design of the electronic circuit.

11. The computer system of claim 10, wherein the establishing comprises updating the chain criticality value for each inverter device of the inverter chain, the chain criticality value being a summed value obtained from criticality values determined for the one or more inverter devices of the inverter chain.

12. The computer system of claim 10, wherein the establishing comprises updating the chain criticality value by a criticality value for an inverter device in the inverter chain, the criticality value being determined, in part, using a fan-out number for a previous inverter device in the inverter chain (PreviousInverterFO).

13. The computer system of claim 10, wherein establishing the chain criticality value comprises updating, for an inverter device in the inverter chain, the chain criticality value by a criticality value determined, in part, by a gain value associated with the inverter device, the gain value being determined as a current inverter size of the inverter device divided by a previous inverter size of a previous inverter device in the inverter chain.

14. The computer system of claim 10, wherein for an inverter device in the inverter chain, the establishing comprises adding a criticality value to the chain criticality value, wherein the criticality value is determined as:

$$\text{Criticality Value} = \frac{3}{\text{Gain} \times \text{PreviousInverterFO}}$$

wherein:

$$\text{Gain} = \frac{\text{CurrentInverterSize}}{\text{PreviousInverterSize}};$$

PreviousInverterFO=Number of fan-out (FO) wires associated with a previous inverter device in the inverter chain;
CurrentInverterSize=An inverter size of the inverter device; and
PreviousInverterSize=An inverter size of the previous inverter device in the inverter chain.

15. The computer system of claim 10, wherein the determining comprises identifying the inverter chain as a dispensable inverter chain where:
the chain criticality value divided by a number of inverter devices in the inverter chain is greater than a set threshold;
a criticality value ascertained for an inverter device of the inverter chain is greater than a criticality value threshold; or
a number of inverter devices in the inverter chain is greater than or equal to a defined number of inverter devices indicative of the dispensable inverter chain.

16. The computer system of claim 10, wherein the establishing comprises establishing a final chain criticality value for the inverter chain by modifying the chain criticality value based upon one or more characteristics of the inverter chain, the one or more characteristics being selected from the group consisting of:
an input fan-out of a first inverter device in the inverter chain;
an output load of a last inverter device in the inverter chain;
whether the inverter chain starts after a macro primary input (PI);
whether the inverter chain feeds a macro primary output (PO); and a distance between a last pin (or last device) of the electronic circuit before the inverter chain, and a first pin (or first device) of the electronic circuit after the inverter chain.

17. A computer program product for facilitating design and manufacture of an electronic circuit, the computer program product comprising:
a computer-readable storage medium readable by a processing circuit and storing instructions for execution by the processing circuit for performing a method comprising:
performing a static timing analysis run of the design of the electronic circuit, the static timing analysis run producing an endpoint report;
facilitating enhancing the design of the electronic circuit to meet predefined design criteria, the facilitating:
ascertaining, by a processing device, that one or more test points of a selected path of the endpoint report are associated with one or more inverter devices of an inverter chain of the design of the electronic circuit;
establishing, by the processing device, a chain criticality value for the inverter chain relative to electronic circuit performance;
determining, by the processing device, whether to identify the inverter chain as a dispensable inverter chain, the determining using, at least in part, the chain criticality value for the inverter chain;
based on the determining identifying the inverter chain as a dispensable inverter chain, indicating that the inverter chain is dispensable, the indicating facilitating enhancing the design of the electronic circuit through the revision of the design of the electronic circuit to produce a revised design of the electronic circuit; and
initiating manufacture of the electronic circuit pursuant, at least in part, to the revised design of the electronic circuit.

18. The computer program product of claim 17, wherein the establishing comprises updating the chain criticality value for each inverter device of the inverter chain, the chain criticality value being a summed value obtained from criticality values determined for the one or more inverter devices of the inverter chain.

19. The computer program product of claim 17, wherein the establishing comprises updating the chain criticality value by a criticality value for an inverter device in the inverter chain, the criticality value being determined, in part, using a fan-out number for a previous inverter device in the inverter chain (PreviousInverterFO).

20. The computer program product of claim 17, wherein establishing the chain criticality value comprises updating, for an inverter device in the inverter chain, the chain criticality value by a criticality value determined, in part, by a gain value associated with the inverter device, the gain value being determined as a current inverter size of the inverter device divided by a previous inverter size of a previous inverter device in the inverter chain.

* * * * *